US009207879B2

(12) United States Patent
Cho

(10) Patent No.: US 9,207,879 B2
(45) Date of Patent: Dec. 8, 2015

(54) REDUNDANT ARRAY OF INDEPENDENT DISK (RAID) CONTROLLED SEMICONDUCTOR STORAGE DEVICE (SSD)-BASED SYSTEM HAVING A HIGH-SPEED NON-VOLATILE HOST INTERFACE

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 40 days.

(21) Appl. No.: 13/176,992

(22) Filed: Jul. 6, 2011

(65) Prior Publication Data

US 2013/0013848 A1 Jan. 10, 2013

(51) Int. Cl.
*G06F 12/00* (2006.01)
*G06F 3/06* (2006.01)

(52) U.S. Cl.
CPC ............ *G06F 3/0688* (2013.01); *G06F 3/0613* (2013.01); *G06F 3/0658* (2013.01); *G06F 3/0689* (2013.01)

(58) Field of Classification Search
CPC ............ G06F 12/0866; G06F 12/0804; G06F 12/0246
See application file for complete search history.

(56) References Cited

U.S. PATENT DOCUMENTS

| 2004/0177219 | A1* | 9/2004 | Meehan et al. | 711/114 |
|---|---|---|---|---|
| 2005/0102470 | A1* | 5/2005 | Ishizaki | 711/114 |
| 2006/0004957 | A1 | 1/2006 | Hand, III et al. | |
| 2008/0256292 | A1* | 10/2008 | Flynn et al. | 711/114 |
| 2009/0024902 | A1 | 1/2009 | Jo et al. | |
| 2010/0125695 | A1* | 5/2010 | Wu et al. | 711/114 |
| 2010/0250848 | A1 | 9/2010 | Kim | |

FOREIGN PATENT DOCUMENTS

| KR | 10-2008-0106775 A | 12/2008 |
|---|---|---|
| KR | 10-2010-0036528 A | 4/2010 |
| KR | 10-2010-0069067 A | 6/2010 |
| KR | 10-2010-0107281 A | 10/2010 |

OTHER PUBLICATIONS

Office Action dated Aug. 2, 2012 in Korean Application No. 10-2012-0073640.

* cited by examiner

*Primary Examiner* — Cheng-Yuan Tseng
*Assistant Examiner* — Arvind Talukdar
(74) *Attorney, Agent, or Firm* — Saliwanchik, Lloyd & Eisenschenk

(57) ABSTRACT

Embodiments of the invention provide a RAID controlled SSD-based system having a high-speed, non-volatile host interface. Specifically, in a typical embodiment, a RAID-controlled device is provided that comprises a high-speed host interface that is coupled to a redundant array of independent disks (RAID) controller. The RAID controller itself is coupled to a set of controlled memory units that each comprises: a main controller coupled to cache memory; and a set of SSD memory units (each having a set of blocks of memory) coupled to the main controller.

14 Claims, 5 Drawing Sheets

REDUNDANT ARRAY OF INDEPENDENT DISK (RAID) CONTROLLED SEMICONDUCTOR STORAGE DEVICE (SSD)-BASED SYSTEM HAVING A HIGH-SPEED NON-VOLATILE HOST INTERFACE

CROSS-REFERENCE TO RELATED APPLICATION

This application is related in some aspects to commonly-owned, co-pending application Ser. No. 12/758,937, entitled SEMICONDUCTOR STORAGE DEVICE", filed on Apr. 13, 2010, the entire contents of which are herein incorporated by reference. This application is also related in some aspects to commonly-owned, co-pending application Ser. No. 12/763,701 entitled RAID CONTROLLED SEMICONDUCTOR STORAGE DEVICE", filed on Apr. 20, 2010, the entire contents of which are herein incorporated by reference. This application is related in some aspects to commonly-owned, co-pending application Ser. No. 12/763,688, entitled RAID CONTROLLER FOR A SEMICONDUCTOR STORAGE DEVICE", filed on Apr. 20, 2010, the entire contents of which are herein incorporated by reference.

FIELD OF THE INVENTION

The present invention relates to a semiconductor storage device (SSD) of a PCI-Express (PCI-e) type. Specifically, the present invention relates to a RAID controlled SSD-based system having a high-speed, non-volatile host interface.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

Embodiments of the invention provide a RAID controlled SSD-based system having a high-speed, non-volatile host interface. Specifically, in a typical embodiment, a RAID-controlled device is provided that comprises a high-speed host interface that is coupled to a redundant array of independent disks (RAID) controller. The RAID controller itself is coupled to a set of controlled memory units that each comprises: a main controller coupled to cache memory; and a set of SSD memory units (each having a set of blocks of memory) coupled to the main controller.

A first aspect of the present invention provides a redundant array of independent disks (RAID) controlled semiconductor storage device (SSD)-based system, comprising: a high-speed, non-volatile host interface; a RAID controller coupled to the high-speed, non-volatile host interface; and a set of memory units coupled to the RAID controller, each of the set of memory units comprising a main controller coupled to the RAID controller, and a SSD memory disk unit coupled to the main controller.

A second aspect of the present invention provides a redundant array of independent disks (RAID) controlled semiconductor storage device (SSD)-based system, comprising: a high-speed, non-volatile host interface; a RAID controller coupled to the high-speed, non-volatile host interface; a first of memory unit coupled to the RAID controller, the first memory unit comprising a first main controller coupled to the RAID controller, and a first SSD memory disk unit coupled to the main controller; and a second of memory unit coupled to the RAID controller, the first memory unit comprising a second main controller coupled to the RAID controller, and a second SSD memory disk unit coupled to the main controller.

A third aspect of the present invention provides a method for providing a redundant array of independent disks (RAID) controlled semiconductor storage device (SSD)-based system, comprising: providing a high-speed, non-volatile host interface; coupling a RAID controller to the high-speed, non-volatile host interface; and coupling a set of memory units to the RAID controller, each of the set of memory units comprising a main controller to the RAID controller, and a SSD memory disk unit coupled to the main controller.

BRIEF DESCRIPTION OF THE DRAWINGS

These and other features of this invention will be more readily understood from the following detailed description of the various aspects of the invention taken in conjunction with the accompanying drawings in which.

Figure 1:
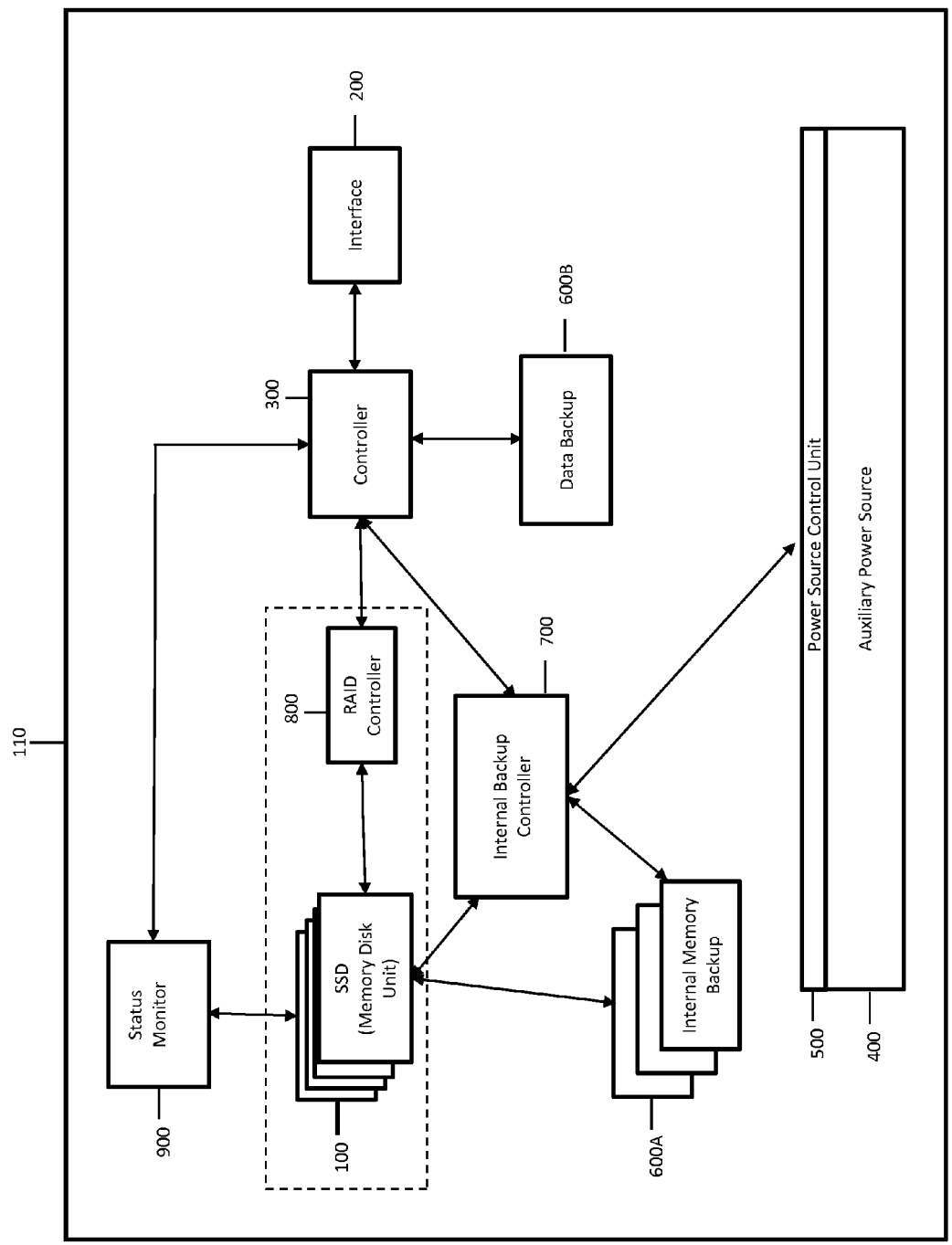
FIG. 1 is a diagram illustrating a configuration of a storage device of a PCI-Express (PCI-e) type according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will now be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limited to this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a storage device of a PCI-Express (PCI-e) type according to an embodiment will be described in detail with reference to the accompanying drawings.

Embodiments of the invention provide a RAID controlled SSD-based system having a high-speed, non-volatile host interface. Specifically, in a typical embodiment, a RAID-controlled device is provided that comprises a high-speed host interface that is coupled to a redundant array of independent disks (RAID) controller. The RAID controller itself is coupled to a set of controlled memory units that each comprises: a main controller coupled to cache memory; and a set of SSD memory units (each having a set of blocks of memory) coupled to the main controller.

The storage device of a PCI-Express (PCI-e) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize Serial Attached Small Computer System Interface (SAS)/Serial Advanced Technology Advancement (SATA) technology in which a SAS/SATA type storage device is provided that utilizes a SAS/SATA interface Referring now to FIG. 1, a diagram schematically illustrating a configuration of a PCI-Express type, RAID controlled semiconductor storage device (e.g., for providing storage for a serially attached computer device) according to an embodiment of the invention is shown. As depicted, FIG. 1 shows a RAID controlled PCI-Express type storage device 110 according to an embodiment of the invention which includes a SSD memory disk unit 100 (referred to herein as SSD memory unit, SSD, and/or SSD memory disk unit) comprising: a plurality of memory disks having a plurality of volatile semiconductor memories/memory units (also referred to herein as high-speed SSD memory disk units 100); a RAID controller 800 coupled to SSD memory disk units 100; an interface unit 200 (e.g., PCI-Express host) which interfaces between the SSD memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit 300, the SSD memory disk units 100, the backup storage unit, and the backup control unit which, when the power transferred from the host through the PCI-Express host interface unit is blocked or an error occurs in the power transferred from the host, receives power from the auxiliary power source unit and supplies the power to the SSD memory disk unit through the controller unit; a backup storage unit 600A-B that stores data of the SSD memory disk unit; and a backup control unit 700 that backs up data stored in the SSD memory disk unit in the backup storage unit, according to an instruction from the host or when an error occurs in the power transmitted from the host; and a redundant array of independent disks (RAID) controller 800 coupled to SSD memory disk unit 100, controller 300, and internal backup controller 700.

The SSD memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The SSD memory disk unit 100 may have a configuration in which the memory disks are arrayed in parallel.

The PCI-Express host interface unit 200 interfaces between a host and the SSD memory disk unit 100. The host may be a computer system or the like, which is provided with a PCI-Express interface and a power source supply device.

The controller unit 300 adjusts synchronization of data signals transmitted/received between the PCI-Express host interface unit 200 and the SSD memory disk unit 100 to control a data transmission/reception speed between the PCI-Express host interface unit 200 and the SSD memory disk unit 100.

As depicted, a PCI-e type RAID controller 800 can be directly coupled to any quantity of SSD memory disk units 100. Among other things, this allows for optimum control of SSD memory disk units 100. Among other things, the use of a RAID controller 800:

1. Supports the current backup/restore operations.
2. Provides additional and improved backup function by performing the following:
   a) the internal backup controller 700 determines the backup (user's request order or the status monitor detects power supply problems);
   b) the internal backup controller 700 requests a data backup to SSD memory disk units;
   c) the internal backup controller 700 requests internal backup device to backup data immediately;
   d) the internal backup controller 700 monitors the status of the backup for the SSD memory disk units and internal backup controller; and
   e) the internal backup controller 700 reports the internal backup controller's status and end-op.

3. Provides additional and improved restore function by performing the following:
   a) the internal backup controller 700 determines the restore (user's request order or the status monitor detects power supply problems);
   b) the internal backup controller 700 requests a data restore to the SSD memory disk units;
   c) the internal backup controller 700 requests an internal backup device to restore data immediately;
   d) the internal backup controller 700 monitors the status of the restore for the SSD memory disk units and internal backup controller; and
   e) the internal backup controller 700 reports the internal backup controller status and end-op.

Figure 2:
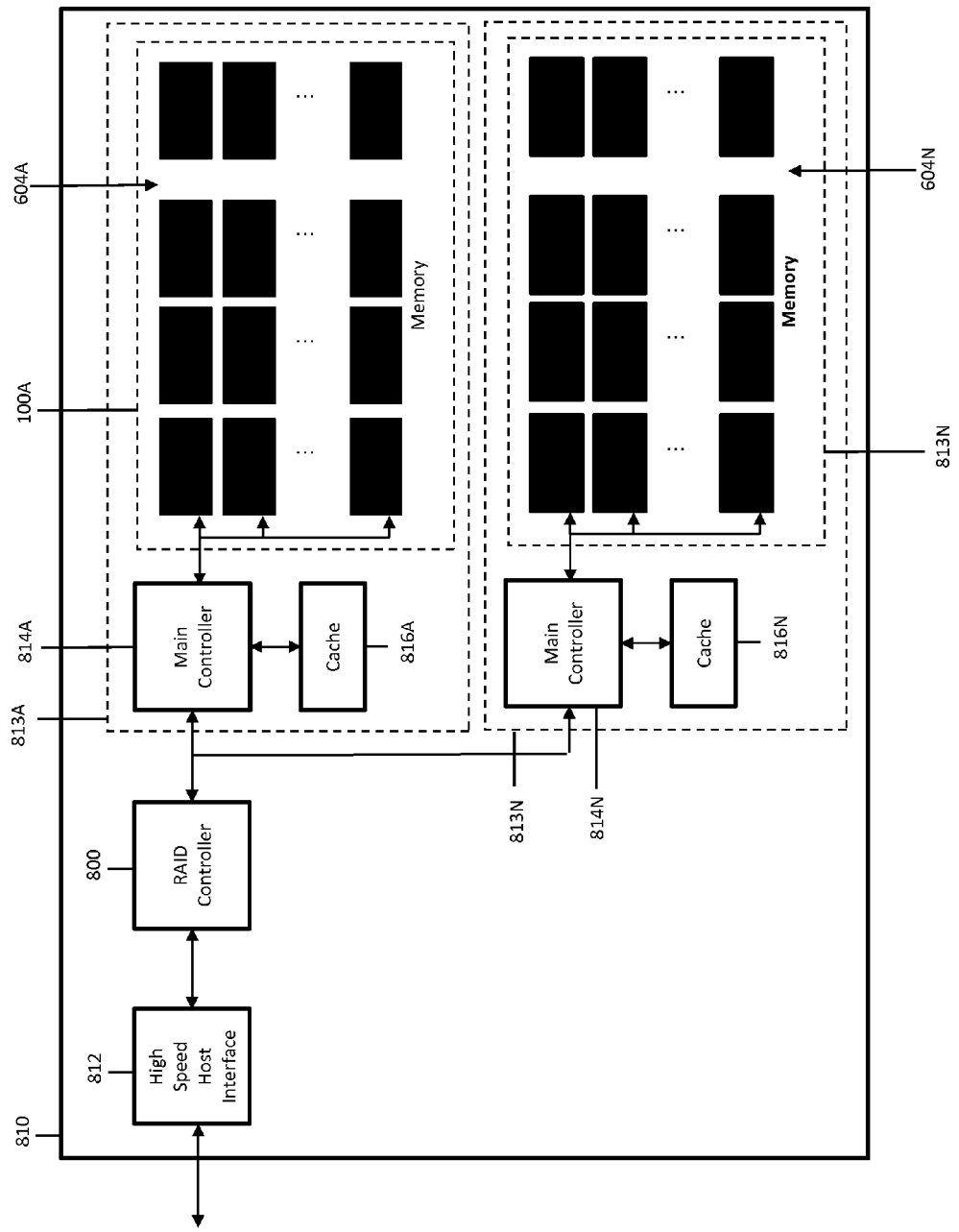
FIG. 2 is a more specific diagram of a RAID controlled SSD-based system having a high-speed, non-volatile host interface according to an embodiment of the present invention.
Figure 3:
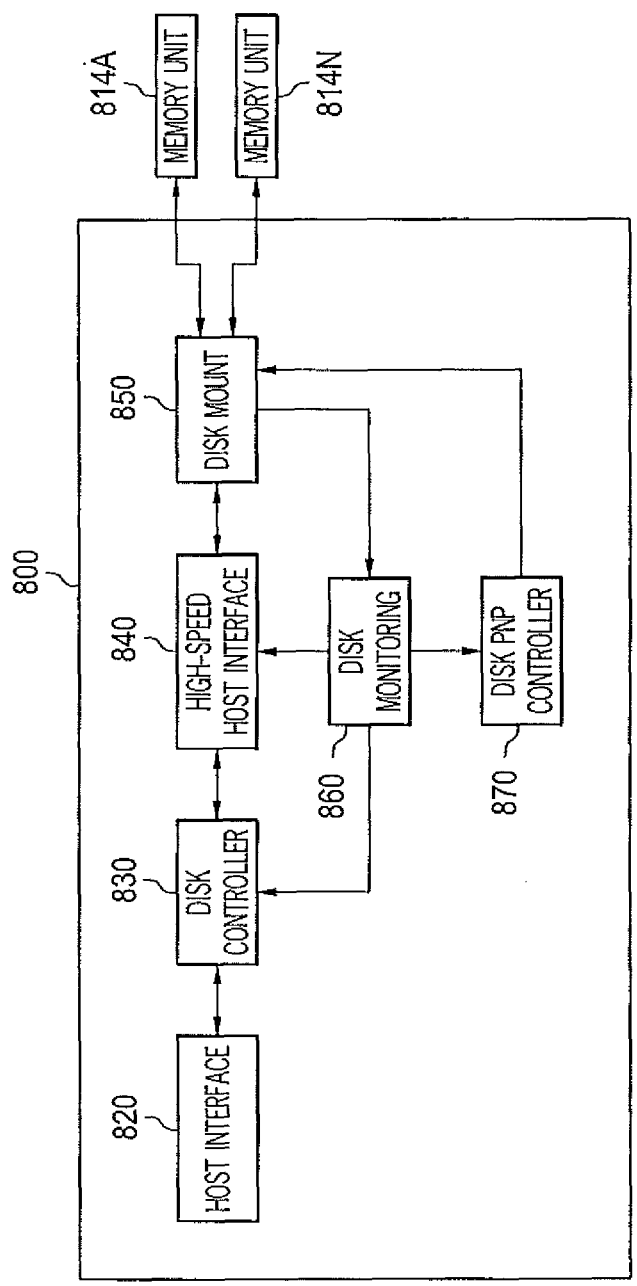
FIG. 3 depicts a more specific diagram of the RAID controller of FIGS. 1-2 according to an embodiment of the present invention.

Referring now to FIG. 2, a RAID controlled SSD-based system 810 according to an embodiment of the present invention is shown. As depicted, system 810 generally comprises a high-speed, non-volatile host interface 812, RAID controller 800 coupled to the high-speed, non-volatile host interface 812, and a set (at least one) of (SSD-based) memory units 813A-N coupled to RAID controller 800. Each shown each of the set of memory units 813A-N comprises a main controller 814A-N coupled to the RAID controller 800, a cache memory unit 816A-N coupled top main controller 814A-N, and a SSD memory disk unit 100A-N coupled to the main controller 814A-N. In addition to other elements (as will be further shown in conjunction with FIG. 5), SSD memory disk units 100A-N generally comprise a set of (semiconductor-based) blocks of memory 604A-N. It is understood that although two memory units 814A-N are shown in FIG. 2, and quantity thereof could be provided. In general, the embodiment shown in FIG. 2: allows high-speed data input-output (I/O) to/from blocks of memory; allows hit rations to be increased via cache memory units 816A-N; allows block data transfer via RAID controller 800; increases overall system efficiency by adding a cache memory unit on the block; and provides an easier to manage cache memory system. In addition, Referring now to FIG. 3, a diagram of the RAID controller 800 of FIGS. 1 and 2 as coupled to a set (at least one) of memory units 814A-N is shown in greater detail. As depicted, RAID controller generally comprises a host interface 820, a disk controller 830 coupled to host interface 820 and a High speed host interface 840. Also coupled to disk controller 830 is a disk monitoring unit 860, which is coupled to the disk mount 850. In general, memory units 814A-N are mounted on disk mount 850, and are detected by disk monitoring unit 860. In addition, disk plug and play (PnP controller), controls the functions and/or detection functions related to disk mount 850. Moreover, RAID controller 100 controls the operation of memory units 814A-N. This includes the detection of memory units 814A-N, the storage and retrieval of data therefrom, etc.

Figure 4:
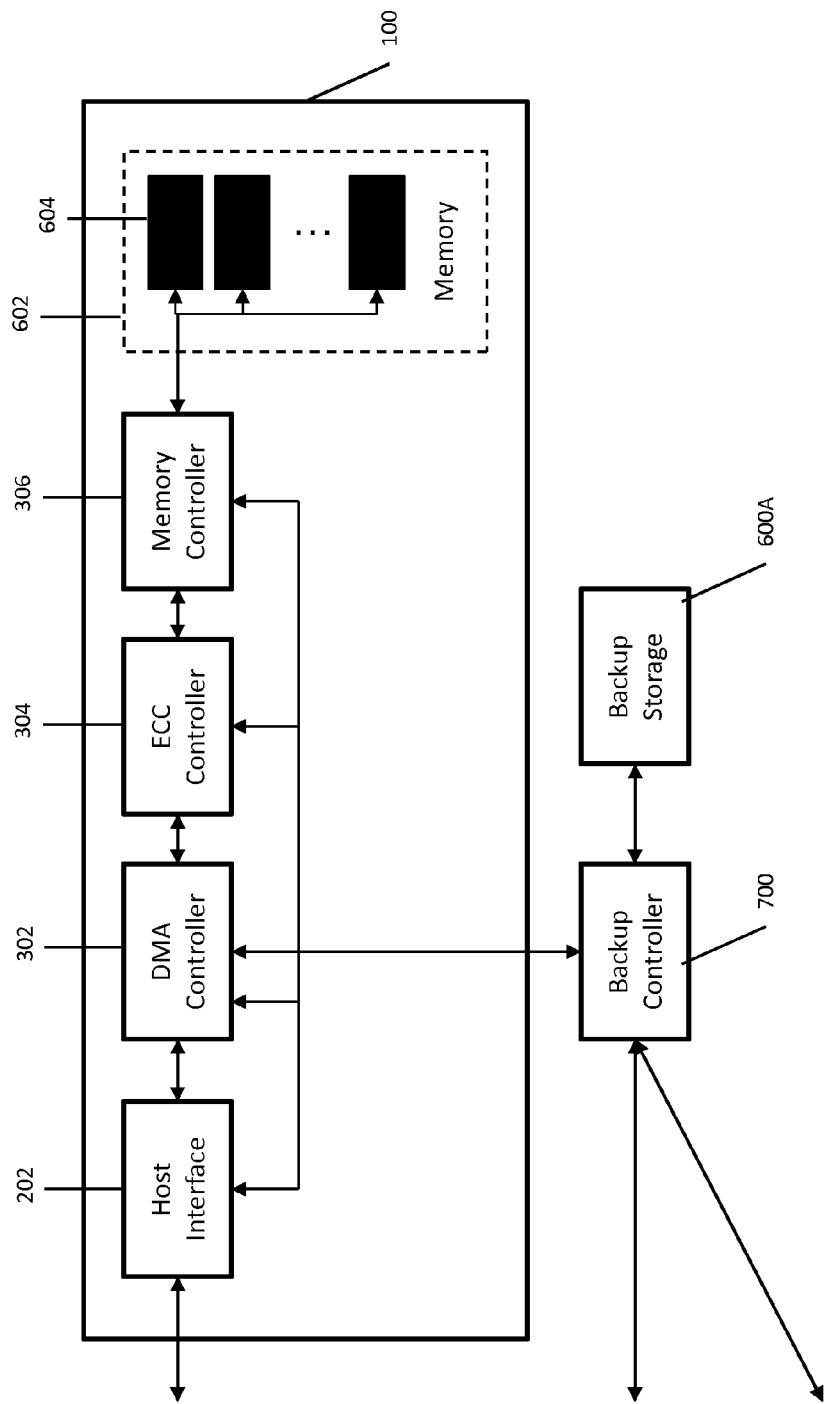
FIG. 4 depicts a more specific diagram of an SSD memory unit according to an embodiment of the present invention.

Referring now to FIG. 4, a diagram schematically illustrating a configuration of a high speed SSD memory disk unit 100 is shown. As depicted, SSD memory disk unit 100 comprises: a host interface 202 (e.g., PCI-Express host) (which can be interface 200 of FIG. 1, or a separate interface as shown); a Direct Memory Access (DMA) controller 302 interfacing with a backup control module 700; an ECC controller 304; and a memory controller 306 for controlling one or more blocks 604 of memory 602 that are used as high speed storage. Also shown are backup controller 700 coupled to DMA controller and backup storage unit 600A coupled to backup controller 700.

In general, DMA is a feature of modern computers and microprocessors that allows certain hardware subsystems within the computer to access system memory for reading and/or writing independently of the central processing unit. Many hardware systems use DMA including disk drive controllers, graphics cards, network cards, and sound cards. DMA is also used for intra-chip data transfer in multi-core processors, especially in multiprocessor system-on-chips, where its processing element is equipped with a local memory (often called scratchpad memory) and DMA is used for transferring data between the local memory and the main memory. Computers that have DMA channels can transfer data to and from devices with much less CPU overhead than computers without a DMA channel. Similarly, a processing element inside a multi-core processor can transfer data to and from its local memory without occupying its processor time and allowing computation and data transfer concurrency.

Without DMA, using programmed input/output (I/O) mode for communication with peripheral devices, or load/store instructions in the case of multi-core chips, the CPU is typically fully occupied for the entire duration of the read or write operation, and is thus unavailable to perform other work. With DMA, the CPU would initiate the transfer, do other operations while the transfer is in progress, and receive an interrupt from the DMA controller once the operation has been done. This is especially useful in real-time computing applications where not stalling behind concurrent operations is critical.

Figure 5:
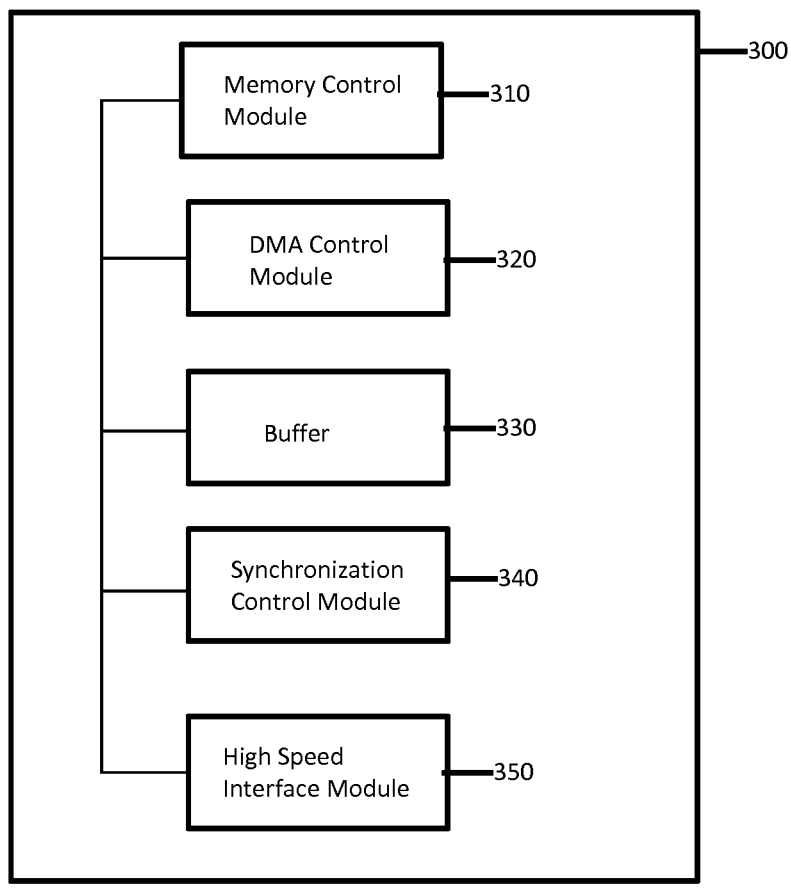
FIG. 5 is a diagram illustrating a configuration of a controller unit in FIG. 1 according to an embodiment of the present invention.

Referring now to FIG. 5, the controller unit 300 of FIG. 1 is shown as comprising: a memory control module 310 which controls data input/output of the SSD memory disk unit 100; a DMA control module 320 which controls the memory control module 310 to store the data in the SSD memory disk unit 100, or reads data from the SSD memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the SSD memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the SSD memory disk unit 100 to transmit the synchronized data signal to the SSD memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data and adjusting data clocks.

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the SSD memory disk unit 100, the backup storage unit 600A-B, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the SSD memory disk unit 100 through the controller unit 300.

The backup storage unit 600A-B is configured as a low-speed non-volatile storage device such as a hard disk and stores data of the SSD memory disk unit 100.

The backup control unit 700 backs up data stored in the SSD memory disk unit 100 in the backup storage unit 600A-B by controlling the data input/output of the backup storage unit 600A-B and backs up the data stored in the SSD memory disk unit 100 in the backup storage unit 600A-B according to an instruction from the host, or when an error occurs in the power source of the host due to a deviation of the power transmitted from the host deviates from the threshold value.

The storage device of a serial-attached small computer system interface/serial advanced technology attachment (PCI-Express) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A redundant array of independent disks (RAID) controlled semiconductor storage device (SSD)-based system, comprising: a high-speed, non-volatile host interface; a RAID controller coupled to the high-speed, non-volatile host interface; and a set of memory units coupled to the RAID controller, each of the set of memory units comprising a main controller coupled to the RAID controller, a SSD memory disk unit coupled to the main controller, and a cache memory unit coupled to the main controller such that hit ratios are increased; wherein the RAID controller comprises a disk mount coupled to the set of memory units and a disk monitoring unit coupled to the disk mount such that the set of memory units is mounted on the disk mount and is detected and monitored by the disk monitoring unit, and a disk plug and play controller coupled to the disk monitoring unit and the disk mount for controlling the disk mount; and wherein the disk monitoring unit is directly connected with the disk mount, the disk plug and play controller, the high-speed host interface, and a disk controller that is connected with a first host interface, respectively.

2. The RAID controlled-based SSD system of claim 1, the SSD memory disk unit comprising a set of blocks of memory.

3. The RAID controlled-based SSD system of claim 2, the SSD memory disk unit further comprising: a second host interface unit; a direct memory access (DMA) controller coupled to the host interface unit; an error correction code (ECC) controller coupled to the DMA controller; and a memory controller coupled to the ECC controller.

4. The RAID controlled-based SSD system of claim 1, wherein the high-speed host interface is coupled to the disk monitoring unit and the disk mount for providing high-speed host interface capabilities.

5. The RAID controlled-based SSD system of claim 4, wherein the disk controller is coupled to the high-speed host interface and the disk monitoring unit.

6. A redundant array of independent disks (RAID) controlled semiconductor storage device (SSD)-based system, comprising: a high-speed, non-volatile host interface; a RAID controller coupled to the high-speed, non-volatile host interface; a first memory unit coupled to the RAID controller, the first memory unit comprising a first main controller coupled to the RAID controller, a first SSD memory disk unit coupled to the main controller, and a first cache memory unit coupled to the first main controller such that hit ratios are increased; and a second memory unit coupled to the RAID controller, the second memory unit comprising a second main controller coupled to the RAID controller, a second SSD memory disk unit coupled to the main controller, and a second cache memory unit coupled to the second main controller such that hit ratios are increased; wherein the RAID controller comprises a disk mount coupled to the first memory unit and the second memory unit and a disk monitoring unit coupled to the disk mount such that the first and the second memory units are mounted on the disk mount and are detected and monitored by the disk monitoring unit, and a disk plug and play controller coupled to the disk monitoring unit and the disk mount for controlling the disk mount; and wherein the disk monitoring unit is directly connected with the disk mount, the disk plug and play controller, the high-speed host interface, and a disk controller that is connected with a first host interface, respectively.

7. The RAID controlled-based SSD system of claim 6, the first SSD memory disk unit comprising a first set of blocks of memory, the second SSD memory disk unit comprising a second set of blocks of memory.

8. The RAID controlled-based SSD system of claim 6, wherein the high-speed host interface is coupled to the disk monitoring unit and the disk mount for providing high-speed host interface capabilities.

9. The RAID controlled-based SSD system of claim 8, wherein the disk controller is coupled to the high-speed host interface and the disk monitoring unit.

10. A method for providing a redundant array of independent disks (RAID) controlled semiconductor storage device (SSD)-based system, comprising: providing a high-speed, non-volatile host interface; coupling a RAID controller to the high-speed, non-volatile host interface; and coupling a set of memory units to the RAID controller, each of the set of memory units comprising a main controller to the RAID controller, a SSD memory disk unit coupled to the main controller, and a cache memory unit coupled to the main controller such that hit ratios are increased; wherein the RAID controller comprises a disk mount coupled to the set of memory units and a disk monitoring unit coupled to the disk mount such that the set of memory units is mounted on the disk mount and is detected and monitored by the disk monitoring unit, and a disk plug and play controller coupled to the disk monitoring unit and the disk mount for controlling the disk mount; and wherein the disk monitoring unit is directly connected with the disk mount, the disk plug and play controller, the high-speed host interface, and a disk controller that is connected with a first host interface, respectively.

11. The method of claim 10, the SSD memory disk unit comprising a set of blocks of memory.

12. The method of claim 11, the SSD memory disk unit further comprising: a second host interface unit; a direct memory access (DMA) controller coupled to the host interface unit; an error correction code (ECC) controller coupled to the DMA controller; and a memory controller coupled to the ECC controller.

13. The method of claim 10,
wherein the high-speed host interface is coupled to the disk monitoring unit and the disk mount for providing high-speed host interface capabilities.

14. The method of claim 13, wherein the disk controller is coupled to the high-speed host interface and the disk monitoring unit.

* * * * *